Feb. 6, 1968    T. H. KINGSBURY    3,367,473
AGITATING ARTICLE FEED CHUTE
Filed July 28, 1966    2 Sheets-Sheet 1
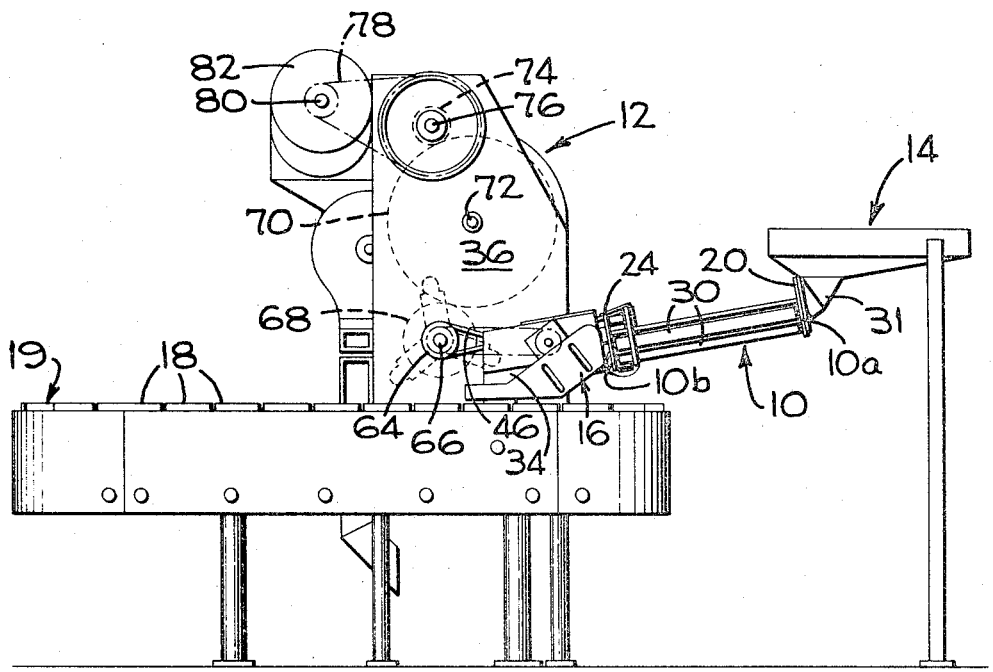
FIG_1
INVENTOR
THOMAS H. KINGSBURY
BY *Francis W. Anderson*
ATTORNEY Feb. 6, 1968  T. H. KINGSBURY  3,367,473
AGITATING ARTICLE FEED CHUTE
Filed July 28, 1966  2 Sheets-Sheet 2
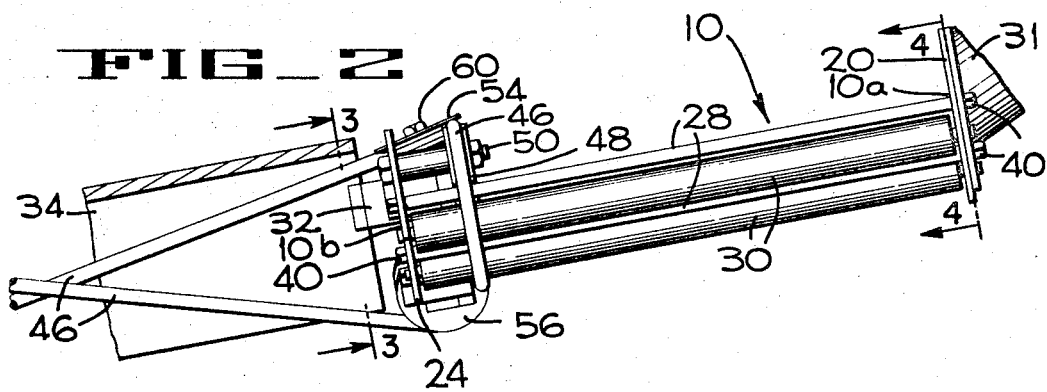
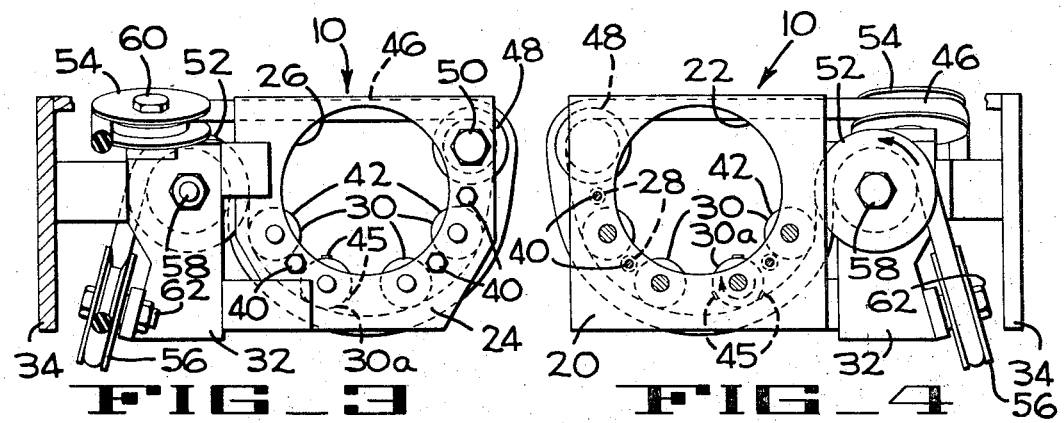
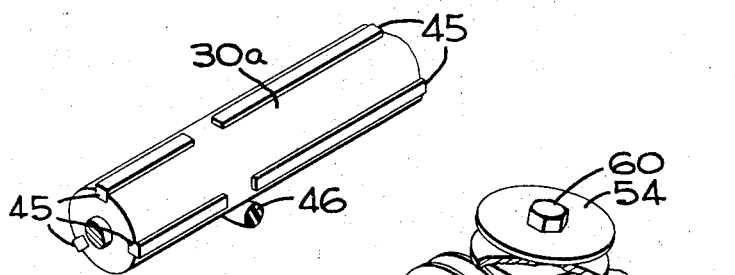
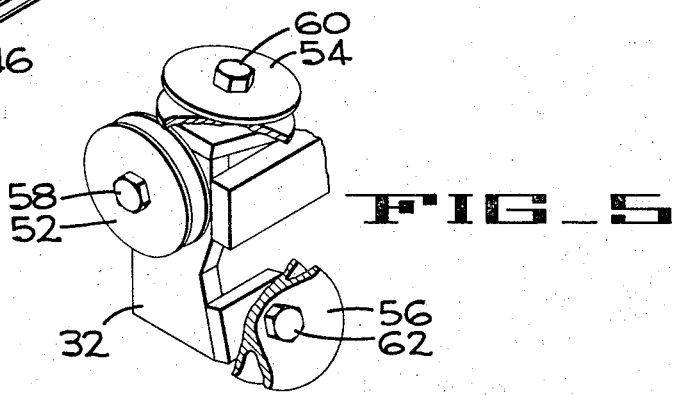
INVENTOR
THOMAS H. KINGSBURY
BY Francis W. Anderson
ATTORNEY _United States Patent Office_

3,367,473
Patented Feb. 6, 1968

3,367,473
AGITATING ARTICLE FEED CHUTE
Thomas H. Kingsbury, Marietta, Ga., assignor to
FMC Corporation, San Jose, Calif., a corporation
of Delaware
Filed July 28, 1966, Ser. No. 568,468
5 Claims. (Cl. 198—30)

ABSTRACT OF THE DISCLOSURE

An article agitating chute for aligning fruit single file comprises four downwardly inclined rollers forming a semi-circular, upwardly opening trough. One of the bottom rollers is provided with axial ribs, and all rollers are turned in the same direction so that the ribbed roller lifts the fruit.

---

The present invention pertains to article handling apparatus and more particularly relates to an agitating chute for reliably aligning fruit in single file and for presenting fruit one at a time for acceptance by a fruit singulator.

The agitating feed chute of the present invention is intended for use in fruit handling apparatus of the type disclosed in the copending application of David Elford, Ser. No. 426,745, which application was filed on Jan. 21, 1965, now Patent No. 3,310,152 and is assigned to the assignee of the present invention.

In the Elford machine an inclined continuously rotating tubular chute was employed to receive generally spherical or ovoid fruit, such as peaches, from a bulk feed hopper, to arrange the fruit in single file, and to deliver the fruit to a timing mechanism which discharges the fruit one at a time into a continuously moving series of peach aligning carriages. The agitating feed chute of the present invention is intended for use in the Elford machine in place of the tubular chute disclosed therein.

It has been determined that in order to reliably deliver fruit into the timing mechanism at the rate of 100 pieces per minute, the fruit in the inclined chute must be agitated or rapidly spinning about an axis that extends longitudinally of the fruit so that the fruit can, in effect, rapidly screw itself toward the timing mechanism as soon as it is free to move downwardly in that direction.

Although a rotating tubular chute of the type disclosed in the Elford application causes some forward movement and agitation of the fruit, such a tubular chute does not impart sufficient rotation to the fruit because of the smooth inner surface unless the tube is excessively inclined. If the inclination of the tubular chute is excessive, the fruit is apt to be injured as it enters the timing mechanism. Also, if the fruit isn't rotating rapidly enough, two small peaches are apt to enter the timing device simultaneously.

It is therefore one object of the present invention to provide an agitating chute that will align in single file and reliably feed one article at a time into a timing mechanism.

Another object is to provide an agitating chute which causes rapid spinning of the fruit about an axis that extends longitudinally of the chute.

Another object is to provide an agitating chute having a ribbed agitating roller therein for effecting rotation of the fruit.

Another object is to provide an agitating chute which reliably spaces the lowermost fruit from the next adjacent fruit.

Another object is to provide an improved drive for the rollers which define the chute.

These and other objects and advantages of the present invention will become apparent from the following description and the accompanying drawings, in which:

FIGURE 1 is a diagrammatic side elevation of the agitating chute of the present invention shown associated with a fruit handling apparatus.

FIGURE 2 is an enlarged side elevation of the chute of FIGURE 1.

FIGURE 3 is a section taken along lines 3—3 of FIGURE 2 illustrating the discharge end of the chute.

FIGURE 4 is a section taken along the lines 4—4 of FIGURE 2 illustrating the upper end of the agitating chute.

FIGURE 5 is an enlarged perspective illustrating certain pulleys used in the drive for the agitating chute.

FIGURE 6 is an enlarged perspective illustrating the lower end of the ribbed agitating roller.

The agitating chute 10 (FIGS. 1 and 2) of the present invention is interposed in the fruit handling apparatus 12 of the type disclosed in the Elford application, and is disposed in an inclined position between a bulk feed mechanism 14 and a timing mechanism 16. Although the bulk feed mechanism 14 is indicated as a hopper, it is to be understood that it may be of any suitable type, such as an endless conveyor with means for deflecting a continuous supply of rollable articles, for example, peaches, into the upper end 10a of the agitating chute 10.

The details of the timing mechanism 16 are not shown or described herein since they form no part of the present invention. In order to better understand the purpose of the agitating chute feed 10, however, it will be understood that the timing mechanism 16 receives fruit from the lower end 10b of the chute 10, singulates the fruit from other fruit presented thereto, and discharges one fruit at a time into fruit alignment carriages 18 that are mounted on a continuously driven conveyor 19. If a more detailed description of the timing mechanism 16, the carriages 18, and the conveyor 19 is desired, reference may be had to said Elford application.

The agitating chute 10 comprises an upper end plate 20 provided with a circular opening 22 (FIG. 4), a lower end plate 24 provided with a circular opening 26 (FIG. 3), a plurality of spaced tie bars 28 disposed between the plates to maintain them in spaced parallel relationship, and a plurality of rollers 30, journaled in and extending between the end plates 20 and 24.

The circular opening 22 of the upper end plate 20 is connected to the lower flanged end of an elbow 31 while the upper end of the elbow 31 is connected as by welding to the bulk feed mechanism or hopper 14. The lower end plate 24 is rigidly secured to a bracket 32 which is welded to a plate 34 rigidly secured to the frame 36 of the fruit handling apparatus 12.

The tie bars 28 may be of any suitable type and as illustrated are rods which are internally threaded to receive capscrews 40. The rollers 30 are freely journaled on the end plates and are positioned so that cylindrical segments 42 thereof project upwardly within the cylindrical space defined by and extending between the two circular end plate openings 22 and 26. The rollers 30 are disposed in a semi-circular arc around the lower halves of the end plates 20 and 24 to provide an upwardly opening trough, as indicated in FIGURES 3 and 4. The rollers are symmetrically disposed on opposite sides of a vertical plane through the trough axis.

In order to assure that the fruit received from the bulk feed mechanism 14 be maintained in abutting contact as well as in single file, the rollers 30 are all continuously driven in the same direction thus imparting a transverse rolling motion to the fruit due to rotation of the rollers 30, and also imparting a longitudinal rolling action to the fruit due to the inclination of the rollers.

An important feature of the invention is that one of the rollers is an agitating roller 30a which is provided with three equally spaced ribs 45 which ribs extend substantially the full length of the roller 30a. When rollers which are approximately 1½" in diameter are used, it has been found desirable for the ribs to extend outwardly from the agitating roller approximately 1/16 of an inch and to have flat outer ends approximately ¼ inch wide with square, rather than round corners. The ribs 45 engage the peaches with sufficient driving force to cause them to spin rapidly, and accordingly, to screw themselves downwardly immediately after the resisting force of the next lower fruit is removed therefrom.

It has been discovered that small fruit tend to wedge between the two lowermost rollers. Accordingly, it is important that the direction of rotation of the ribbed agitating roller 30a is such that the ribs 45 tend to lift the fruit upwardly out of the space between the lowermost rollers rather than push the fruit downwardly into the space between the two lowermost rollers. Thus, the direction of rotation of the agitating roller 30a is clockwise as viewed in FIGURE 4.

Another feature of the invention is to train a single endless belt 46, which is preferably of circular cross section, around all of the rollers 30 so as to simply and reliably drive all rollers in the same direction and at the same speed. In this regard, the belt 46 engages a cylindrical surface of the agitating roller 30a that is devoid of ribs and indicated in FIGURE 6. The belt 46 is trained around a first idler pulley 48 (FIGS. 3 and 4) journaled on a bolt 50 that is parallel to the axes of the rollers 30 and is secured to the lower end plate 24, a second idler pulley 52 disposed in planar alignment with the first idler pulley 48, a third idler pulley 54, and a fourth idler pulley 56 which rotates about an axis that is normal to the axes of the rollers 30. The pulleys 52, 54 and 56 are journaled on bolts 58, 60 and 62, respectively, which are secured to the bracket 32 as clearly shown in FIGURES 3 and 5. Although the pulleys 48, 52, 54 and 56 are shown adjacent the lower end of the chute 10, it is apparent that these pulleys and the rollers could be moved upwardly to a position near the midpoint or the upper end of the chute 10 if desired.

The belt 46 is twisted and is also trained around a drive pulley 64 (FIG. 1) that is keyed to a shaft 66 journaled in the frame 36 of the fruit handling apparatus 12. A gear 68 keyed to the shaft 66 meshes with a gear 70 that is keyed to a shaft 72 journaled in the frame 36. The gear 70 also meshes with a drive gear 74 that is keyed to a shaft 76 journaled in the frame 36. A chain and sprocket drive 78 interconnects the shaft 76 with the shaft 80 of a motor 82 thereby continuously driving the rollers 30.

In the operation of the agitating chute 10 of the present invention, the rollers 30 are all continuously driven in a clockwise direction as viewed in FIGURE 4. Fruit is continuously directed into the upper end of the inclined chute from the bulk feed mechanism 14, and upon contacting the rollers is immediately agitated and caused to spin due to the gripping engagement between the ribs of the agitating roller 30a and the fruit. The rapidly spinning fruit forms a single line of abutting fruit in the chute 10. The lowermost one of the spinning fruit is immediately propelled downwardly into the timing mechanism 16 upon being released for movement into the timing mechanism. Thus, upon each opening of the timing mechanism 16, one and only one fruit is immediately twisted into the timing mechanism 16 thereby assuring that each carriage 18 of the fruit handling apparatus 12 is filled as it moves away from the agitating chute 10 of the present invention.

From the foregoing description it is apparent that the agitating chute of the present invention includes a series of arcuately arranged inclined rollers that are continuously driven, and which includes one roller that is provided with ribs so as to impart a spinning motion to fruit disposed within the chute. This spinning motion assures that the fruit will assume a single file within the chute, and also assures that the lowermost fruit, when free to move out of the chute, will be immediately propelled from the lower end thereof due to the combined forces imparted thereto by the spinning action caused by the ribs and by the downward inclination of the chute.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. An article aligning chute comprising support means, a plurality of spaced rollers journaled on said support means, each roller having an inlet end and a discharge end with the inlet end disposed above the discharge end, said rollers being positioned to cradle a series of abutting articles therein, a plurality of ribs secured to one roller and projecting outwardly from the periphery of said one roller for engaging said articles to rapidly spin the same, and a flexible resilient belt trained around said rollers for driving all of said rollers in the same direction whereby said rollers cause all of the abutting articles to spin about axes which extend longitudinally of said rollers and whereby the lowermost spinnings articles will rapidly advance themselves out of said discharge end when free to move therepast.

2. An article aligning chute according to claim 1, wherein said article aligning ribs are evenly spaced around the periphery of said one roller and are parallel to and extend substantially the full length of the rollers, except for the area contacted by said belt.

3. An article aligning chute according to claim 2, wherein four rollers are provided, and the rollers are disposed in a semi-circular arc to provide an upwardly opening trough, said rollers being symmetrically disposed on opposite sides of a vertical plane through the trough axis, said ribbed roller being one of the bottom rollers, said rollers being turned in a direction such that the side of the ribbed roller which is adjacent said vertical plane moves upwardly for lifting articles in the trough.

4. An apparatus according to claim 2, wherein said ribs have flat outer surfaces and longitudinally extending square corners for engaging and gripping the fruit to agitate and spin the same.

5. An article aligning chute comprising axially spaced supports, four rollers extending axially between said supports and disposed in a semi-circular arc to form an upwardly opening trough, said rollers being symmetrically disposed on opposite sides of a vertical plane through the trough axis, a plurality of parallel ribs extending axially along one of said rollers forming the bottom of the trough, and means for turning all of said rollers in the same direction, said direction being such that the side of said ribbed roller which is adjacent said vertical plane moves upwardly for lifting articles in the trough.

References Cited

UNITED STATES PATENTS

| 3,101,866 | 8/1963 | Anderson | 198—127 |
| 3,126,087 | 3/1964 | Anderson | 198—34 |

FOREIGN PATENTS

| 232,403 | 4/1925 | Great Britain. |

RICHARD E. AEGERTER, *Primary Examiner.*